United States Patent
Rovik et al.

(10) Patent No.: US 11,374,241 B2
(45) Date of Patent: Jun. 28, 2022

(54) FUEL CELL VEHICLE WITH A WATER SYSTEM

(71) Applicant: Toyota Motor Engineering & Manufacturing North America, Inc., Plano, TX (US)

(72) Inventors: Christopher Lee Rovik, McKinney, TX (US); Luke A. Rippelmeyer, Plano, TX (US); Daniel Charles Folick, Long Beach, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/939,596

(22) Filed: Jul. 27, 2020

(65) Prior Publication Data

US 2022/0029176 A1     Jan. 27, 2022

(51) Int. Cl.
| | |
|---|---|
| *H01M 8/04029* | (2016.01) |
| *H01M 8/04007* | (2016.01) |
| *H01M 8/04119* | (2016.01) |
| *B60L 58/40* | (2019.01) |
| *B60L 58/33* | (2019.01) |
| *B60L 50/72* | (2019.01) |

(52) U.S. Cl.
CPC ......... *H01M 8/04029* (2013.01); *B60L 50/72* (2019.02); *B60L 58/33* (2019.02); *B60L 58/40* (2019.02); *H01M 8/04074* (2013.01); *H01M 8/04156* (2013.01); *H01M 2250/20* (2013.01)

(58) Field of Classification Search
CPC ......... H01M 8/04029; H01M 8/04074; H01M 8/04156; H01M 2250/20; B60L 50/72; B60L 58/33; B60L 58/40
See application file for complete search history.

(56) References Cited

U.S. PATENT DOCUMENTS

| | | | |
|---|---|---|---|
| 6,432,568 B1 * | 8/2002 | Salvador | H01M 8/04302 429/423 |
| 2002/0184901 A1 | 12/2002 | Ishikawa | |
| 2003/0148155 A1 | 8/2003 | Matthews et al. | |
| 2005/0199192 A1 | 9/2005 | Goebel et al. | |

(Continued)

FOREIGN PATENT DOCUMENTS

| | | |
|---|---|---|
| DE | 102008029529 A1 | 10/2009 |
| JP | 2019075254 A | 5/2019 |
| JP | 2019091529 A | 6/2019 |

*Primary Examiner* — Adam A Arciero
(74) *Attorney, Agent, or Firm* — Christopher G. Darrow; Darrow Mustafa PC (57) ABSTRACT

A vehicle includes at least one fuel cell stack, a water reservoir housed higher than the at least one fuel cell stack, a first water pump, a second water pump and a control module. The at least one fuel cell stack is operable to generate electrical energy and water. The water reservoir is operable to store water. The first water pump is operable to pump water from the at least one fuel cell stack into the water reservoir against gravity. The second water pump is operable to dispense water from the water reservoir under assistance from gravitational potential energy of water in the water reservoir. The control module is configured to operate the second water pump on an on-demand basis, and operate the first water pump on a time-selective basis.

20 Claims, 4 Drawing Sheets

(56) References Cited

U.S. PATENT DOCUMENTS

| | | | |
|---|---|---|---|
| 2008/0093140 A1* | 4/2008 | Asai | B62D 21/17 |
| | | | 180/65.1 |
| 2009/0035612 A1* | 2/2009 | Suematsu | H01M 8/04089 |
| | | | 429/432 |
| 2010/0025311 A1 | 2/2010 | Jones et al. | |
| 2019/0103615 A1 | 4/2019 | Sakajo et al. | |
| 2019/0115605 A1 | 4/2019 | Sakajo et al. | |
| 2019/0181463 A1* | 6/2019 | Kwon | H01M 8/04701 |

* cited by examiner

FUEL CELL VEHICLE WITH A WATER SYSTEM

TECHNICAL FIELD

The embodiments disclosed herein relate to vehicles and, more particularly, to vehicles that have electrified powertrains.

BACKGROUND

Many vehicles are electrified vehicles or, in other words, vehicles that have electrified powertrains. The typical electrified vehicle has a more or less traditional drivetrain. Specifically, as part of the drivetrain, the electrified vehicle includes one or more wheels, as well as a transmission, a differential, a drive shaft and the like, to which the wheels are mechanically connected. However, in place of an engine, the electrified vehicle includes one or more motors. And, as part of the electrified powertrain, the drivetrain is mechanically connected to the motors. In conjunction with the drivetrain, the motors are operable to power the wheels using electrical energy.

Many electrified vehicles are, moreover, fuel cell vehicles (FCVs) or, in other words, electrified vehicles that include one or more fuel cell stacks. In the typical FCV, the fuel cell stacks are operable to generate electrical energy, including the electrical energy used by the motors to power the wheels. In addition to being operable to generate electrical energy, the fuel cell stacks are operable to generate water.

SUMMARY

Disclosed herein are embodiments of a vehicle that includes a fuel cell stack and elements of a water system for reclaiming water from the fuel cell stack for dispensation. In one aspect, a vehicle includes at least one fuel cell stack, a water reservoir housed higher than the at least one fuel cell stack, a first water pump, a second water pump and a control module. The at least one fuel cell stack is operable to generate electrical energy and water. The water reservoir is operable to store water. The first water pump is operable to pump water from the at least one fuel cell stack into the water reservoir against gravity. The second water pump is operable to dispense water from the water reservoir under assistance from gravitational potential energy of water in the water reservoir. The control module is configured to operate the second water pump on an on-demand basis, and operate the first water pump on a time-selective basis.

In another aspect, a vehicle includes at least one fuel cell stack, at least one battery, a water reservoir housed higher than the at least one fuel cell stack, a first water pump, a second water pump and a control module. The at least one fuel cell stack is operable to generate electrical energy and water. The at least one battery is operable to store electrical energy. The water reservoir is operable to store water. The first water pump is operable to pump water from the at least one fuel cell stack into the water reservoir against gravity using electrical energy from the at least one battery. The second water pump is operable to dispense water from the water reservoir under assistance from gravitational potential energy of water in the water reservoir using electrical energy from the at least one battery. The control module is configured to operate the second water pump on an on-demand basis, and operate the first water pump on a time-selective basis to inhibit electrical energy levels in the at least one battery from becoming too low.

In yet another aspect, a vehicle includes a drivetrain, at least one fuel cell stack, at least one motor, at least one battery, a water reservoir housed higher than the at least one fuel cell stack, a first water pump, a second water pump and a control module. The drivetrain includes at least one wheel. The at least one fuel cell stack is operable to generate electrical energy and water. The at least one motor is operable to power the at least one wheel using electrical energy from the at least one fuel cell stack, and generate electrical energy using the at least one wheel, and consequently retard the at least one wheel. The at least one battery is operable to store electrical energy from any combination of the at least one fuel cell stack and the at least one motor. The water reservoir is operable to store water. The first water pump is operable to pump water from the at least one fuel cell stack into the water reservoir against gravity using electrical energy from the at least one battery. The second water pump is operable to dispense water from the water reservoir under assistance from gravitational potential energy of water in the water reservoir using electrical energy from the at least one battery. The control module is configured to operate the second water pump on an on-demand basis. Moreover, the control module is configured to identify sufficient electrical energy levels in the at least one battery for the first water pump to pump water from the at least one fuel cell stack into the water reservoir, and operate the first water pump in response to sufficient electrical energy levels in the at least one battery.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a fuel cell stack and elements of a water system for reclaiming water from the fuel cell stack for dispensation. The fuel cell stack generates electrical energy and water. In addition to the fuel cell stack, the vehicle includes one or more batteries for storing electrical energy, a water reservoir for storing water, a first water pump for pumping water from the fuel cell stack into the water reservoir using electrical energy from the batteries, and one or more second water pumps for dispensing water from the water reservoir using electrical energy from the batteries. In relation to issues concerning electrical energy levels in the batteries becoming too low when, in association with dispensing water from the water reservoir, the second water pumps use electrical energy from the batteries on an on-demand basis, the water reservoir is housed higher than the fuel cell stack. Accordingly, the second water pumps dispense water from the water reservoir under assistance from gravitational potential energy of water in the water reservoir, and, in association therewith, use commensurately less electrical energy from the batteries. Additionally, in association with pumping water from the fuel cell stack into the water reservoir, the first water pump uses electrical energy from the batteries on a time-selective basis to inhibit electrical energy levels in the batteries from becoming too low.

Figure 1:
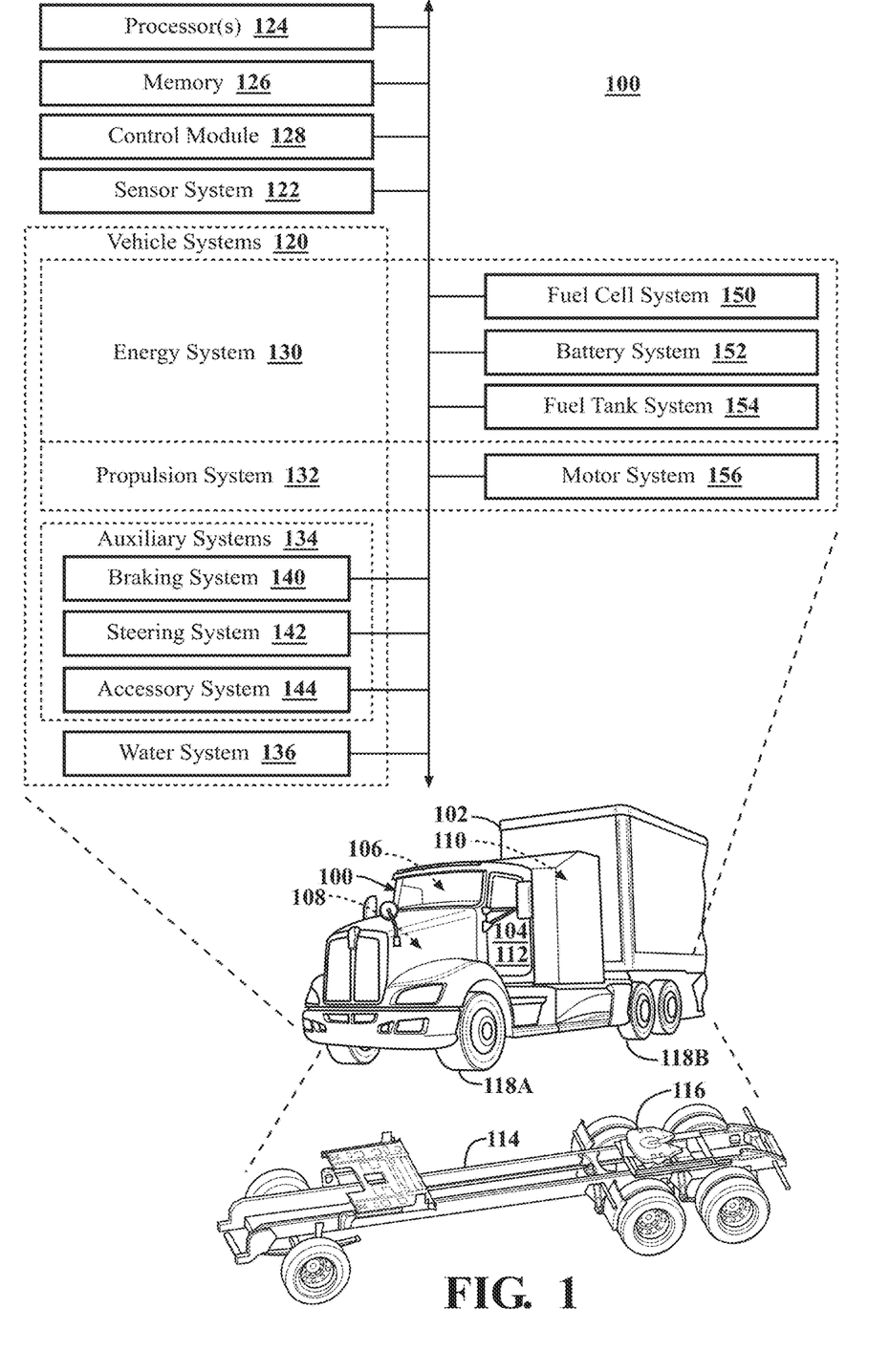
FIG. 1 is a portrayal of a fuel cell vehicle (FCV) using a communicative block diagram and perspective views, showing a body, a chassis, vehicle systems, a sensor system and a control module, with the vehicle systems including an energy system, including a fuel cell system, a battery system and a fuel tank system therein, a propulsion system, including a motor system therein, auxiliary systems and a water system.

A fuel cell vehicle (FCV) 100 is shown in FIG. 1. In this description, uses of "front," "forward" and the like, and uses of "rear," "rearward" and the like, refer to the longitudinal directions of the FCV 100. "Front," "forward" and the like refer to the front (fore) of the FCV 100, while "rear," "rearward" and the like refer to the back (aft) of the FCV 100. Uses of "side," "sideways," "transverse" and the like refer to the lateral directions of the FCV 100, with "driver's side" and the like referring to the left side of the FCV 100, and "passenger side" and the like referring to the right side of the FCV 100.

The FCV 100 is a semi-tractor or, in other words, a tractor unit that, together with a hitched semitrailer 102, forms a semi-truck. The FCV 100 has an exterior 104 and a number of interior compartments. The compartments include a passenger compartment 106, a front compartment 108 forward of the passenger compartment 106 and a rear compartment 110 rearward of the passenger compartment 106. The FCV 100 may include, among other things, seats and a dash assembly housed in the passenger compartment 106.

The FCV 100 has a body 112 that forms the exterior 104 and defines the compartments. The body 112 has upright sides, a floor, a front end, a rear end, a roof and the like. In the semi-truck to which the FCV 100 belongs, the semitrailer 102 similarly has an exterior and, as an interior compartment, a cargo compartment for carrying cargo. In addition to the body 112, the FCV 100 has a chassis 114. The chassis 114 serves as an underbody for the FCV 100. The chassis 114, like the body 112, forms the exterior 104. As part of the chassis 114, the FCV 100 includes a hitch 116 for hitching the semitrailer 102 to the FCV 100. With the semitrailer 102 hitched to the FCV 100, the FCV 100 is operable to pull the semitrailer 102 and any onboard cargo.

The FCV 100 has a drivetrain. The drivetrain is part of, mounted to or otherwise supported by the chassis 114. The drivetrain may be housed, in whole or in part, in any combination of the chassis 114, the front compartment 108, the rear compartment 110 or elsewhere in the FCV 100. As part of the drivetrain, the FCV 100 includes wheels 118. The wheels 118 support the remainder of the FCV 100 on the ground. The FCV 100 includes ten wheels 118, two of which are front wheels 118A, and eight of which are rear wheels 118B. The rear wheels 118B are arranged in four dual-wheel setups. One, some or all of the wheels 118 are powered to drive the FCV 100 along the ground. In a rear-wheel drive arrangement, one, some or all of the rear wheels 118B are powered to drive the FCV 100 along the ground. For this purpose, also as part of the drivetrain, in addition to the wheels 118, the FCV 100 includes any penultimate combination of a transmission, a differential, a drive shaft and the like, to which the wheels 118 are mechanically connected.

The FCV 100 operates as an assembly of interconnected items that equip the FCV 100 to satisfy real-time vehicle demands. Generally speaking, a vehicle demand corresponds to a vehicle function whose performance satisfies the vehicle demand. Accordingly, the FCV 100 is equipped, in operation, to satisfy one or more vehicle demands by performing one or more corresponding vehicle functions. With respect to performing vehicle functions, the FCV 100 is subject to any combination of manual operation and autonomous operation. In the case of manual operation, the FCV 100 may be manual-only. In the case of autonomous operation, the FCV 100 may be semi-autonomous, highly-autonomous or fully-autonomous.

For purposes of satisfying vehicle demands, the FCV 100 includes one or more vehicle systems 120. Either alone or in conjunction with the drivetrain, the vehicle systems 120 are operable to perform vehicle functions on behalf of the FCV 100, and thereby satisfy corresponding vehicle demands on behalf of the FCV 100. Any combination of the vehicle systems 120 may be operable to perform a vehicle function. Accordingly, from the perspective of a vehicle function, as well as a corresponding vehicle demand, one, some or all of the vehicle systems 120 serve as associated vehicle systems 120. Moreover, each vehicle system 120 may be operable to perform any combination of vehicle functions, and thereby satisfy any combination of corresponding vehicle demands, in whole or in part. Accordingly, each vehicle system 120, from its own perspective, serves as an associated vehicle system 120 for one or more vehicle functions, as well as one or more corresponding vehicle demands.

In addition to the vehicle systems 120, the FCV 100 includes a sensor system 122, as well as one or more processors 124, memory 126, and a control module 128 to which the vehicle systems 120 and the sensor system 122 are communicatively connected. The sensor system 122 is operable to detect information about the FCV 100. The processors 124, the memory 126 and the control module 128 together serve as a computing device whose control module 128 orchestrates the operation of the FCV 100, in whole or in part. Specifically, the control module 128 operates the vehicle systems 120 based on information about the FCV 100. Accordingly, as a prerequisite to operating the vehicle systems 120, the control module 128 gathers information about the FCV 100, including the information about the FCV 100 detected by the sensor system 122. The control module 128 then evaluates the information about the FCV 100, and operates the vehicle systems 120 based on its evaluation. As part of its evaluation of the information about the FCV 100, the control module 128 identifies one or more vehicle demands. Relatedly, as part of its operation of the vehicle systems 120, when a vehicle demand is identified, the control module 128 operates one or more associated vehicle systems 120 to satisfy the vehicle demand.

The vehicle systems 120 are part of, mounted to or otherwise supported by the chassis 114. The vehicle systems 120 may be housed, in whole or in part, in any combination of the chassis 114, the passenger compartment 106, the front compartment 108, the rear compartment 110 or elsewhere in the FCV 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy system 130 and a propulsion system 132. The energy system 130 and the propulsion system 132 are electrically connected to one another. Moreover, the drivetrain is mechanically connected to the propulsion system 132. The propulsion system 132 and the drivetrain together serve as an electrified powertrain for the FCV 100. The energy system 130 is operable to perform one or more energy functions, including but not limited to generating electrical energy and generating water. The propulsion system 132 is operable to perform one or more propulsion functions using electrical energy from the energy system 130, including but not limited to powering the wheels 118.

Specifically, the energy system 130 is operable to generate electrical energy, store electrical energy, condition and otherwise handle electrical energy, and store and otherwise handle fuel. In conjunction with the drivetrain, the propulsion system 132 is operable to power the wheels 118 using electrical energy from the energy system 130. With the wheels 118 powered, the propulsion system 132 is employable to accelerate the FCV 100, maintain the speed of the FCV 100 (e.g., on level or uphill ground) and otherwise drive the FCV 100 along the ground. The propulsion system 132 is also operable to generate electrical energy using one, some or all of the wheels 118, and consequently retard the wheels 118. With the wheels 118 retarded, the propulsion system 132 is employable to decelerate the FCV 100, maintain the speed of the FCV 100 (e.g., on downhill ground) and otherwise drive the FCV 100 along the ground. The energy system 130, in turn, is operable to store electrical energy from the propulsion system 132. As the combined product of generating electrical energy, and consequently retarding the wheels 118, and storing electrical energy, the propulsion system 132 and the energy system 130 are operable to regeneratively brake the FCV 100 at the wheels 118.

In addition to the energy system 130 and the propulsion system 132, the vehicle systems 120 include one or more auxiliary systems 134 and a water system 136. The auxiliary systems 134 include a braking system 140, a steering system 142 and an accessory system 144. The auxiliary systems 134 and the water system 136, like the propulsion system 132, are electrically connected to the energy system 130. Moreover, the water system 136 is fluidly connected to the energy system 130. The auxiliary systems 134 are operable to perform one or more auxiliary functions using electrical energy from the energy system 130, including but not limited to frictionally braking the FCV 100, steering the FCV 100 and one or more accessory functions. The water system 136 is operable to perform one or more water functions using electrical energy and water from the energy system 130, including but not limited to reclaiming, dispensing and otherwise handling water from the energy system 130. Accordingly, although the propulsion system 132 acts as the principal electrical energy load on the energy system 130, the auxiliary systems 134 and the water system 136 act as electrical energy loads on the energy system 130 as well. Moreover, in addition to acting as an electrical energy load on the energy system 130, the water system 136 acts as a water load on the energy system 130.

As part of the sensor system 122, the FCV 100 includes one or more onboard sensors. The sensors monitor the FCV 100 in real-time. The sensors, on behalf of the sensor system 122, are operable to detect information about the FCV 100, including information about user requests and information about the operation of the FCV 100.

The FCV 100 includes user controls. The user controls serve as interfaces between users of the FCV 100 and the FCV 100 itself, and are operable to receive mechanical, verbal and other user inputs requesting vehicle functions. In conjunction with corresponding user controls, and among the sensors, the FCV 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 118, user inputs requesting braking, steering and the like, user inputs requesting accessory functions, and user inputs requesting water functions.

Also among the sensors, the FCV 100 includes one or more speedometers, one or more gyroscopes, one or more accelerometers, one or more wheel sensors, one or more inertial measurement units (IMUs), one or more controller area network (CAN) sensors and the like. Relatedly, among information about the operation of the FCV 100, the sensor system 122 is operable to detect the location and motion of the FCV 100, including its speed, acceleration, orientation, rotation, direction and the like, the movement of the wheels 118, and the operational statuses of one, some or all of the vehicle systems 120.

The energy system 130 includes a fuel cell system 150, a battery system 152 and a fuel tank system 154. The propulsion system 132 includes a motor system 156. The motor system 156 is electrically connected to the fuel cell system 150. Moreover, the battery system 152 and the fuel cell system 150 are electrically connected to one another, and the motor system 156 and the battery system 152 are electrically connected to one another. Moreover, the fuel cell system 150 is fluidly connected to the fuel tank system 154. The fuel cell system 150 is operable to generate electrical energy and water using electrical energy from the battery system 152 and fuel from the fuel tank system 154. In conjunction with the drivetrain, the motor system 156 is operable to power the wheels 118 using electrical energy from any combination of the fuel cell system 150 and the battery system 152. The motor system 156 is also operable to generate electrical energy using the wheels 118, and consequently retard the wheels 118. The battery system 152 is operable to store electrical energy from the fuel cell system 150. The battery system 152 is also operable to store electrical energy from the motor system 156. The fuel tank system 154 is operable to store and otherwise handle fuel, including fueling the fuel cell system 150 with fuel.

Figure 2A:
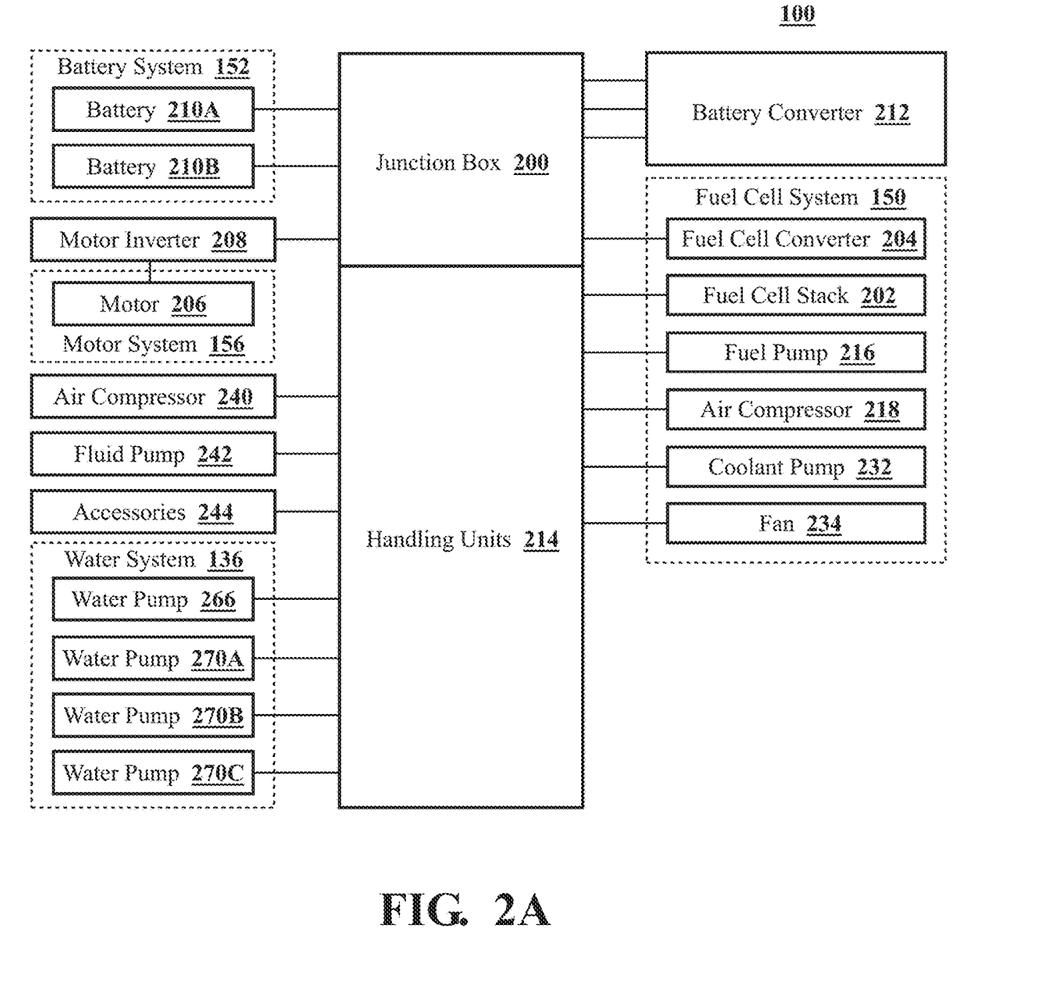
FIGS. 2A and 2B are portrayals of the FCV using an electrical block diagram and a fluid and pneumatic schematic diagram, further showing the fuel cell system, including a fuel cell stack and a heat exchanger for the fuel cell stack in the fuel cell system, the fuel tank system, including fuel tanks and a fuel piping network for the fuel tanks in the fuel tank system, and the water system, including a water collector, a water pump and a water reservoir in the water system for reclaiming water from the fuel cell stack for dispensation, and water pumps in the water system for applying water from the water reservoir onto the heat exchanger and otherwise dispensing water from the water reservoir.
Figure 2B:
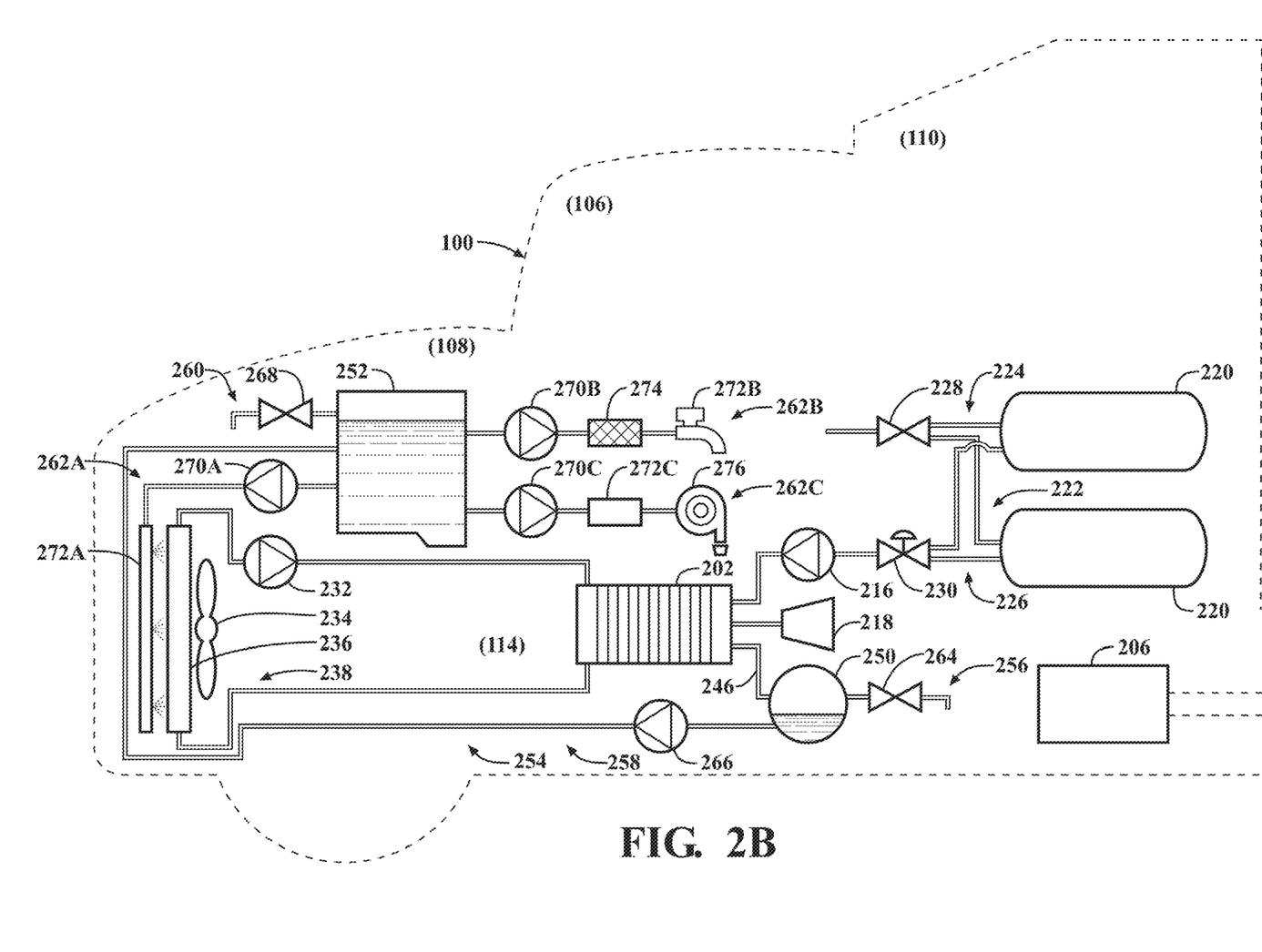

As shown with additional reference to FIGS. 2A and 2B, in addition to the fuel cell system 150, the battery system 152 and the fuel tank system 154, the energy system 130 includes a junction box 200 and attendant energy elements. The motor system 156 is electrically connected to the fuel cell system 150 through the junction box 200. Moreover, the battery system 152 and the fuel cell system 150 are electrically connected to one another through the junction box 200, and the motor system 156 and the battery system 152 are electrically connected to one another through the junction box 200.

The FCV 100 includes one or more energy elements as part of the fuel cell system 150. Among the energy elements of the fuel cell system 150, the FCV 100 includes a fuel cell stack 202. Although the FCV 100, as shown, includes one fuel cell stack 202 in the fuel cell system 150, it will be understood that this disclosure is applicable in principle to otherwise similar vehicles including multiple fuel cell stacks 202 in the fuel cell system 150. In relation to the fuel cell stack 202, among the attendant energy elements of the energy system 130, the FCV 100 includes a fuel cell converter 204. The fuel cell converter 204 is electrically connected to the fuel cell stack 202. The fuel cell stack 202 is operable to generate electrical energy. The fuel cell converter 204 is operable to condition electrical energy from the fuel cell stack 202. Specifically, the fuel cell converter 204 is a DC/DC converter operable to convert lower voltage DC electrical energy from the fuel cell stack 202 into higher voltage DC electrical energy. For instance, the lower voltage DC electrical energy may be medium voltage DC electrical energy (e.g., approximately 370 VDC), and the higher voltage DC electrical energy may be high voltage DC electrical energy (e.g., approximately 650 VDC).

The FCV 100 also includes one or more propulsion elements as part of the motor system 156. Among the propulsion elements of the motor system 156, the FCV 100 includes a motor 206. Although the FCV 100, as shown, includes one motor 206 in the motor system 156, it will be understood that this disclosure is applicable in principle to otherwise similar vehicles including multiple motors 206 in the motor system 156. The motor 206 is a synchronous three-phase AC electric motor. In relation to the motor 206, among the attendant energy elements of the energy system 130, the FCV 100 includes a motor inverter 208. The motor inverter 208 is electrically connected to the fuel cell converter 204 through the junction box 200, and the motor 206 is electrically connected to the motor inverter 208. Moreover, the drivetrain is mechanically connected to the motor 206. The motor inverter 208 is operable to condition electrical energy from the fuel cell converter 204. Specifically, the motor inverter 208 is operable to convert DC electrical energy from the fuel cell converter 204 into three-phase AC electrical energy. For instance, the three-phase AC electrical energy may be high voltage AC electrical energy (e.g., approximately 650 VAC). In conjunction with the drivetrain, the motor 206 is operable to power the wheels 118 using electrical energy from the motor inverter 208.

The FCV 100 also includes one or more energy elements as part of the battery system 152. Among the energy elements of the battery system 152, the FCV 100 includes one or more batteries 210. Although the FCV 100, as shown, includes two batteries 210 in the battery system 152, it will be understood that this disclosure is applicable in principle to otherwise similar vehicles including one battery 210 in the battery system 152, as well as otherwise similar vehicles otherwise including multiple batteries 210 in the battery system 152. In relation to the batteries 210, among the attendant energy elements of the energy system 130, the FCV 100 includes a battery converter 212. From the perspective of the fuel cell system 150, the battery converter 212 is electrically connected to the fuel cell converter 204 through the junction box 200, and the batteries 210 are electrically connected to the battery converter 212 through the junction box 200. The battery converter 212 is operable to condition electrical energy from the fuel cell converter 204. Specifically, the battery converter 212 is a DC/DC converter operable to convert higher voltage DC electrical energy from the fuel cell converter 204 into lower voltage DC electrical energy. For instance, the higher voltage DC electrical energy may be high voltage DC electrical energy (e.g., approximately 650 VDC), and the lower voltage DC electrical energy may be medium voltage DC electrical energy (e.g., approximately 288 VDC). The batteries 210 are operable to store electrical energy from the battery converter 212.

Also, from the perspective of the battery system 152, the battery converter 212 is electrically connected to the batteries 210 through the junction box 200, the motor inverter 208 is electrically connected to the battery converter 212 through the junction box 200 and, as noted above, the motor 206 is electrically connected to the motor inverter 208. Relatedly, the battery converter 212 is also operable to condition electrical energy from the batteries 210. Specifically, the battery converter 212 is a DC/DC converter operable to convert lower voltage DC electrical energy from the batteries 210 into higher voltage DC electrical energy. For instance, the lower voltage DC electrical energy may be medium voltage DC electrical energy (e.g., approximately 288 VDC), and the higher voltage DC electrical energy may be high voltage DC electrical energy (e.g., approximately 650 VDC). The motor inverter 208 is also operable to condition electrical energy from the battery converter 212. Specifically, the motor inverter 208 is operable to convert DC electrical energy from the battery converter 212 into three-phase AC electrical energy. As noted above, the three-phase AC electrical energy may be high voltage AC electrical energy (e.g., approximately 650 VAC). Once again, in conjunction with the drivetrain, the motor 206 is operable to power the wheels 118 using electrical energy from the motor inverter 208.

Similarly, from the perspective of the motor system 156, the motor inverter 208 is electrically connected to the motor 206, the battery converter 212 is electrically connected to the motor inverter 208 through the junction box 200 and, as noted above, the batteries 210 are electrically connected to the battery converter 212 through the junction box 200. Relatedly, in conjunction with the drivetrain, the motor 206 is also operable to generate electrical energy using the wheels 118, and consequently retard the wheels 118. Moreover, the motor inverter 208 is also operable to condition electrical energy from the motor 206. Specifically, the motor inverter 208 is operable to convert three-phase AC electrical energy from the motor 206 into DC electrical energy. For instance, the three-phase AC electrical energy may be high voltage AC electrical energy (e.g., approximately 650 VAC), and the DC electrical energy may be high voltage DC electrical energy (e.g., approximately 650 VDC). The battery converter 212 is also operable to condition electrical energy from the motor inverter 208 in the same manner as electrical energy from the fuel cell converter 204. Once again, the batteries 210 are operable to store electrical energy from the battery converter 212. As the combined product of generating electrical energy, consequently retarding the wheels 118 and storing electrical energy, the motor 206 and the batteries 210 are operable to regeneratively brake the FCV 100 at the wheels 118.

Among other things, it follows that the motor 206 is operable to power the wheels 118 using electrical energy from any combination of the fuel cell stack 202 and the batteries 210. Moreover, the batteries 210 are operable to store electrical energy from any combination of the fuel cell stack 202 and the motor 206. In a fuel cell stack-powered implementation, the motor 206 principally powers the wheels 118 using electrical energy from the fuel cell stack 202. When the fuel cell stack 202 generates surplus electrical energy, the motor 206 powers the wheels 118 using some electrical energy from the fuel cell stack 202, and the batteries 210 store some electrical energy from the fuel cell stack 202. Otherwise, the motor 206 powers the wheels 118 using all electrical energy from the fuel cell stack 202, and the batteries 210 store no electrical energy from the fuel cell stack 202. Moreover, when the fuel cell stack 202 generates insufficient electrical energy, the motor 206 powers the wheels 118 using not only all electrical energy from the fuel cell stack 202, but also some electrical energy from the batteries 210. Absent the fuel cell stack 202 generating surplus electrical energy when the motor 206 powers the wheels 118, the batteries 210 principally store electrical energy from the motor 206 when the motor 206 generates electrical energy using the wheels 118, and consequently retards the wheels 118.

Also among the attendant energy elements of the energy system 130, the FCV 100 includes one or more handling units 214. The handling units 214 are electrically connected to the batteries 210 through the junction box 200. The handling units 214 may include one or more power supplies (e.g., one or more DC power supplies), one or more inverters, one or more converters (e.g., one or more DC/DC converters) and the like. The handling units 214 are operable to condition and otherwise handle electrical energy from the batteries 210, including but not limited to distributing electrical energy from the batteries 210 and conditioning electrical energy from the batteries 210 (e.g., converting DC electrical energy from the batteries 210 into three-phase AC electrical energy, converting higher voltage DC electrical energy from the batteries 210 into lower voltage DC electrical energy, etc.).

As noted above, the FCV 100 includes the fuel cell stack 202 among the energy elements of the fuel cell system 150. Also among the energy elements of the fuel cell system 150, the FCV 100 includes a fuel pump 216 and an air compressor 218. The fuel pump 216 and the air compressor 218 are electrically connected to the handling units 214. Moreover, the fuel pump 216 is fluidly connected to the fuel tank system 154, and the fuel cell stack 202 is fluidly connected to the fuel pump 216. Moreover, in addition to being fluidly connected to the fuel pump 216, the fuel cell stack 202 is pneumatically connected to the air compressor 218. The fuel pump 216 is operable to pump fuel from the fuel tank system 154 into the fuel cell stack 202 using electrical energy from the handling units 214. The air compressor 218 is operable to pump air into the fuel cell stack 202 using electrical energy from the handling units 214.

The fuel cell stack 202 includes multiple fuel cells arranged in a stacked setup. Employing the fuel cells, the fuel cell stack 202 is operable to execute an electrochemical reaction that combines fuel with oxygen in air, and generates electrical energy. As a byproduct of generating electrical energy, the electrochemical reaction generates water. Moreover, also as a byproduct of generating electrical energy, the electrochemical reaction generates heat. Accordingly, in conjunction with the fuel pump 216 and the air compressor 218, as the product of executing the electrochemical reaction, the fuel cell stack 202 is operable to generate electrical energy and water, as well as heat. As the product of generating heat, the fuel cell stack 202 vaporizes some water in the fuel cell stack 202, including water from the fuel cell stack 202.

In a hydrogen-fueled implementation, the fuel is hydrogen. In the fuel cell stack 202, each fuel cell includes an anode and a cathode. In the fuel cells, hydrogen from the fuel pump 216 is pumped to the anodes where, as part of the electrochemical reaction, hydrogen molecules are activated by anode catalysts. Activated hydrogen molecules thereby release electrons, and become hydrogen ions. Released electrons travel from the anodes to the cathodes, thereby generating electrical current. In the fuel cell stack 202, electrical current generated by the fuel cells serves as electrical energy generated by the fuel cell stack 202. In the fuel cells, hydrogen ions also travel from the anodes to the cathodes. Oxygen in air from the air compressor 218 is pumped to the cathodes where, as part of the electrochemical reaction, hydrogen ions bond with oxygen on cathode catalysts to generate water. In the fuel cell stack 202, water generated by the fuel cells is a byproduct of generating electrical energy, and serves as water generated by the fuel cell stack 202.

The FCV 100 also includes one or more energy elements as part of the fuel tank system 154. Among the energy elements of the fuel tank system 154, the FCV 100 includes one or more fuel tanks 220, as well as a fuel piping network 222 for the fuel tanks 220. Although the FCV 100, as shown, includes two fuel tanks 220 in the fuel tank system 154, it will be understood that this disclosure is applicable in principle to otherwise similar vehicles including one fuel tank 220 in the fuel tank system 154, as well as otherwise similar vehicles otherwise including multiple fuel tanks 220 in the fuel tank system 154. The fuel tanks 220 are operable to store fuel. From the perspective of the fuel tanks 220, the fuel piping network 222 has a fuel input line 224 and a fuel output line 226. In the hydrogen-fueled implementation, the fuel is hydrogen. Relatedly, each fuel tank 220 is a high-pressure hydrogen tank, and operable to store high-pressure hydrogen, and the fuel piping network 222 is a high-pressure hydrogen piping network.

The fuel input line 224 leads to the fuel tanks 220. On the fuel input line 224, in addition to the requisite piping, the fuel piping network 222 includes a fuel valve 228. The fuel valve 228 is fluidly connectable to a fueling station's fueling line, and each fuel tank 220 is fluidly connected to the fuel valve 228. The fuel valve 228 is operable to selectively open or close the fuel input line 224 to one, some or all of the fuel tanks 220. With the fuel valve 228 fluidly connected to a fueling line, as the product of opening the fuel input line 224 to one, some or all of the fuel tanks 220, the fuel valve 228 is operable to open a fluid connection from the fueling line to one, some or all of the fuel tanks 220. From the perspective of each fuel tank 220, with a fluid connection opened from the fueling line to the fuel tank 220, the fuel piping network 222 is employable to fill the fuel tank 220 with fuel from the fueling line. Moreover, with a fluid connection opened from the fueling line to multiple fuel tanks 220, the fuel piping network 222 is employable to simultaneously fill the fuel tanks 220 with fuel from the fueling line.

The fuel output line 226 leads from the fuel tanks 220 to the fuel cell system 150. On the fuel output line 226, in addition to the requisite piping, the fuel piping network 222 includes a fuel regulator 230. The fuel regulator 230 is fluidly connected to each fuel tank 220, and the fuel cell system 150, at the fuel pump 216, is fluidly connected to the fuel regulator 230. The fuel regulator 230 is operable to selectively open or close the fuel output line 226 from one, some or all of the fuel tanks 220. Moreover, the fuel regulator 230 is operable to regulate the properties of fuel in the fuel output line 226. Specifically, the fuel regulator 230 is a pressure regulator operable to regulate the pressure of fuel in the fuel output line 226. As the product of opening the fuel output line 226 from one, some or all of the fuel tanks 220, the fuel regulator 230 is operable to open a fluid connection from one, some or all of the fuel tanks 220 to the fuel cell system 150. From the perspective of each fuel tank 220, with a fluid connection opened from the fuel tank 220 to the fuel cell system 150, the fuel piping network 222 is employable to fuel the fuel cell system 150 with fuel from the fuel tank 220. Moreover, with a fluid connection opened from multiple fuel tanks 220 to the fuel cell system 150, the fuel piping network 222 is employable to simultaneously fuel the fuel cell system 150 with fuel from the fuel tanks 220.

As noted above, the fuel cell stack 202 is operable to generate heat. Relatedly, also among the energy elements of the fuel cell system 150, the FCV 100 includes a coolant pump 232, a fan 234 and a coolant-to-air heat exchanger 236 for the fuel cell stack 202. The coolant pump 232 and the heat exchanger 236 belong to a coolant circuit 238 that, in addition to the coolant pump 232 and the heat exchanger 236, includes the fuel cell stack 202. The heat exchanger 236 includes one or more radiators and the like. The coolant pump 232 and the fan 234 are electrically connected to the handling units 214. The coolant pump 232 is operable to circulate water or other coolant in the coolant circuit 238 using electrical energy from the handling units 214. The fan 234 is operable to induce airflow across the heat exchanger 236 using electrical energy from the handling units 214. The heat exchanger 236 is operable to reject heat from coolant passing through the heat exchanger 236 to airflow across the heat exchanger 236. The fuel cell stack 202 is operable to reject heat from the fuel cell stack 202 to coolant passing through the fuel cell stack 202. In conjunction with the coolant circuit 238, the coolant pump 232, the fan 234 and the fuel cell stack 202, as the product of rejecting heat from coolant passing through the heat exchanger 236 to airflow across the heat exchanger 236, the heat exchanger 236 is operable to reject heat from the fuel cell stack 202.

The auxiliary systems 134 are electrically connected to battery system 152 through the junction box 200. The FCV 100 includes one or more auxiliary elements as part of the braking system 140. Among the auxiliary elements of the braking system 140, the FCV 100 includes an air compressor 240, as well as one or more friction brakes at one, some or all of the wheels 118. The air compressor 240 is electrically connected to the handling units 214. The friction brakes are pneumatically connected to the air compressor 240, and the wheels 118 are mechanically connected to the friction brakes. The air compressor 240 is operable to pump air into the friction brakes using electrical energy from the handling units 214. The friction brakes are operable to frictionally brake the FCV 100 at the wheels 118 using air from the air compressor 240.

The FCV 100 also includes one or more auxiliary elements as part of the steering system 142. Among the auxiliary elements of the steering system 142, the FCV 100 includes a fluid pump 242, as well as one or more steering mechanisms at one, some or all of the wheels 118. The fluid pump 242 is electrically connected to the handling units 214. The steering mechanisms are hydraulically connected to the fluid pump 242, and the wheels 118 are mechanically connected to the steering mechanisms. The fluid pump 242 is operable to pump power steering fluid into the steering mechanisms using electrical energy from the handling units 214. The steering mechanisms are operable to adjust the steering angle of the wheels 118 using power steering fluid from the fluid pump 242. In a front-wheel steer arrangement, one steering system 142 is operable to adjust the steering angle of both front wheels 118A using power steering fluid from the fluid pump 242. In conjunction with the fluid pump 242, as the product of adjusting the steering angle of the wheels 118, the steering mechanisms are operable to steer the FCV 100 as it drives along the ground.

The FCV 100 also includes one or more auxiliary elements as part of the accessory system 144. Among the auxiliary elements of the accessory system 144, the FCV 100 includes one or more accessories 244. The accessories 244 are typical of vehicles, and include any combination of one or more interior lights, one or more exterior lights, one or more gauges, one or more infotainment systems, one or more navigation systems and the like. The accessories 244 are electrically connected to the handling units 214. The accessories 244 are operable to illuminate the FCV 100, signal driving intentions, deliver information about the operation of the FCV 100, deliver infotainment content to users of the FCV 100, establish routes and directions for the FCV 100, and otherwise perform accessory functions using electrical energy from the handling units 214.

As noted above, the FCV 100 includes the fuel cell stack 202 among the energy elements of the fuel cell system 150. Also among the energy elements of the fuel cell system 150, the FCV 100 includes an exhaust 246 for the fuel cell stack 202. The exhaust 246 is fluidly connected to the fuel cell stack 202, and opens outside the fuel cell stack 202. The exhaust 246 is operable to exhaust water, including, among other water, vaporized water, from the fuel cell stack 202.

The water system 136 is fluidly connected to the fuel cell stack 202 at the exhaust 246. Downstream of the exhaust 246, the FCV 100 includes one or more water elements as part of the water system 136. Among the water elements of the water system 136, the FCV 100 includes a water collector 250 and a water reservoir 252, as well as a water piping network 254 for the water collector 250 and the water reservoir 252. The water piping network 254 includes a water discharge line 256, a water storage line 258, a water evacuation line 260 and one or more water dispensation lines 262.

The water collector 250 is fluidly connected to the exhaust 246. In conjunction with the exhaust 246, the water collector 250 is operable to collect water from the fuel cell stack 202. In association with collecting water from the fuel cell stack 202, the water collector 250 is operable to de-vaporize vaporized water from the fuel cell stack 202 for collection in the water collector 250. For instance, in a water condensation implementation, the water collector 250 includes a heat sink. The heat sink is operable to reject heat from vaporized water in the water collector 250 to airflow around the water collector 250. As the product of rejecting heat from vaporized water in the water collector 250, the heat sink is operable to condense vaporized water for collection in the water collector 250. Additionally, or alternatively, in a water knockout implementation, the water collector 250 includes a vapor-liquid separator. The vapor-liquid separator is operable to remove water from vaporized water in the water collector 250. As the product of removing water from vaporized water in the water collector 250, the vapor-liquid separator is operable to remove water from vaporized water for collection in the water collector 250.

The water discharge line 256 leads from the water collector 250 to outside the water collector 250. Specifically, the water discharge line 256 leads to the environment surrounding the FCV 100. On the water discharge line 256, in addition to the requisite piping, the water piping network 254 includes a water valve 264. The water valve 264 is fluidly connected to the water collector 250. The water valve 264 is operable to selectively open or close the water discharge line 256 from the water collector 250. As the product of opening the water discharge line 256 from the water collector 250, the water valve 264 is operable to discharge water from the water collector 250, including discharging, among other water, vaporized water from the water collector 250. For instance, the water valve 264 is operable to discharge water from the water collector 250 when water levels in the water collector 250 are too high. Moreover, with the exhaust 246 fluidly connected to the fuel cell stack 202, and the water collector 250 fluidly connected to the exhaust 246, as the product of discharging vaporized water from the water collector 250, the water valve 264 is operable to relieve or otherwise regulate backpressure in the fuel cell stack 202 associated with vaporized water in the water collector 250.

The water storage line 258 leads from the water collector 250 to the water reservoir 252. On the water storage line 258, in addition to the requisite piping, the water piping network 254 includes a water pump 266. The water pump 266 is electrically connected to the handling units 214. Moreover, the water pump 266 is fluidly connected to the water collector 250, and the water reservoir 252 is fluidly connected to the water pump 266. The water pump 266 is operable to pump water from the water collector 250 into the water reservoir 252 using electrical energy from the handling units 214. The water reservoir 252 is operable to store water. Accordingly, in conjunction with the exhaust 246 and the water collector 250, the water pump 266 is operable to pump water from the fuel cell stack 202 into the water reservoir 252 for storage. Likewise, the water reservoir 252 is operable to store water from the fuel cell stack 202 for dispensation onboard the FCV 100. As the combined product of collecting water from the fuel cell stack 202, pumping water from the fuel cell stack 202 into the water reservoir 252 for storage, and storing water from the fuel cell stack 202, the water collector 250, the water pump 266 and the water reservoir 252 are operable to reclaim water from the fuel cell stack 202 for dispensation onboard the FCV 100.

The water evacuation line 260 leads from the water reservoir 252 to outside the water reservoir 252. Specifically, the water evacuation line 260 leads to the environment surrounding the FCV 100. On the water evacuation line 260, in addition to the requisite piping, the water piping network 254 includes a water valve 268. The water valve 268 is fluidly connected to the water reservoir 252. The water valve 268 is operable to selectively open or close the water evacuation line 260 from the water reservoir 252. As the product of opening the water evacuation line 260 from the water reservoir 252, the water valve 268 is operable to evacuate water from the water reservoir 252. For instance, the water valve 268 is operable to evacuate water from the water reservoir 252 when water levels in the water reservoir 252 are too high.

Each water dispensation line 262 leads from the water reservoir 252 to onboard the FCV 100. On each water dispensation line 262, in addition to the requisite piping, the water piping network 254 includes a water pump 270 and a water dispenser 272. For each water pump 270 and water dispenser 272, the water pump 270 is electrically connected to the handling units 214. Moreover, the water pump 270 is fluidly connected to the water reservoir 252, and the water dispenser 272 is fluidly connected to the water pump 270. Moreover, in addition to being fluidly connected to the water pump 270, the water dispenser 272 opens onboard the FCV 100. The water pump 270 is operable to pump water from the water reservoir 252 through the water dispenser 272 using electrical energy from the handling units 214. The water dispenser 272 is operable to dispense water passing through the water dispenser 272. Accordingly, in conjunction with the water dispenser 272, the water pump 270 is operable to dispense water from the water reservoir 252 onboard the FCV 100. For instance, the water pump 270 may be operable to dispense water from the water reservoir 252 into the front compartment 108, into the passenger compartment 106 or into the rear compartment 110, as well as at the exterior 104.

Among other things, it follows that the water pump 266 pumps water from the fuel cell stack 202 into the water reservoir 252 using electrical energy from the batteries 210. Moreover, the water pumps 270 dispense water from the water reservoir 252 using electrical energy from the batteries 210.

With the FCV 100 including multiple batteries 210 in the battery system 152, the batteries 210 include a motor battery 210A and a complementary battery 210B. The motor battery 210A is dedicated to handling the electrical energy loads on the battery system 152 from the motor system 156 and, in particular, those from the motor 206. The complementary battery 210B is dedicated to handling the remaining electrical energy loads on the battery system 152 from the remainder of the vehicle systems 120 besides the motor system 156, including those from the energy system 130, including those from the fuel cell system 150, those from the auxiliary systems 134 and those from the water system 136.

The FCV 100 includes multiple packaging spaces for housing the vehicle elements of the vehicle systems 120. Among the packaging spaces, the FCV 100 includes the chassis 114, including underneath the passenger compartment 106, underneath the front compartment 108 and underneath the rear compartment 110. Also among the packaging spaces, above the chassis 114, the FCV 100 includes the front compartment 108 and the rear compartment 110. The vehicle elements housed in the chassis 114 are lower (i.e., closer to the ground) than the vehicle elements housed in the front compartment 108 and the rear compartment 110. Equally, the vehicle elements housed in the front compartment 108 and the rear compartment 110 are higher (i.e., further from the ground) than the vehicle elements housed in the chassis 114.

As noted above, the FCV 100 includes the fuel cell stack 202 among the energy elements of the fuel cell system 150, the fuel tanks 220 among the energy elements of the fuel tank system 154, and the motor 206 among the propulsion elements of the motor system 156. The fuel cell stack 202 and the motor 206 are housed in the chassis 114. Specifically, the fuel cell stack 202 is housed in the chassis 114 underneath the passenger compartment 106, and the motor 206 is housed in the chassis 114 underneath the rear compartment 110. In relation to the fuel cell stack 202, the FCV 100 may include a support rack mounted to the chassis 114 underneath the passenger compartment 106, and the fuel cell stack 202 may be mounted to the support rack. In relation to the motor 206, the FCV 100 may include a motor cradle mounted to the chassis 114 underneath the rear compartment 110, and the motor 206 may be mounted to the motor cradle. The fuel tanks 220 are housed above the chassis 114. Specifically, the fuel tanks 220 are housed above the chassis 114 in the rear compartment 110. In relation to the fuel tanks 220, the FCV 100 may include a support rack housed in the rear compartment 110, and, with the support rack mounted to or otherwise supported by the chassis 114, the fuel tanks 220 may be mounted to the support rack.

Moreover, in relation to reclaiming water from the fuel cell stack 202, the FCV 100 includes the water collector 250 and the water reservoir 252 among the water elements of the water system 136. For purposes of collecting water from the fuel cell stack 202, the fuel cell stack 202 and the water collector 250 share the same packaging space in the FCV 100. Accordingly, like the fuel cell stack 202, the water collector 250 is housed in the chassis 114. Specifically, the water collector 250 is housed in the chassis 114 underneath the passenger compartment 106. In relation to the fuel cell stack 202 and the water collector 250, the FCV 100 may include a common support rack mounted to the chassis 114 underneath the passenger compartment 106, and the fuel cell stack 202 and the water collector 250 may be mounted to the common support rack. On the other hand, for purposes of storing water from the fuel cell stack 202, the fuel cell stack 202 and the water reservoir 252 share different packaging spaces in the FCV 100. Accordingly, unlike the fuel cell stack 202, the water reservoir 252 is housed above the chassis 114. Specifically, the water reservoir 252 is housed above the chassis 114 in the front compartment 108. In relation to the water reservoir 252, the FCV 100 may include a support stand housed in the front compartment 108, and, with the support stand mounted to or otherwise supported by the chassis 114, the water reservoir 252 may be mounted to the support stand. Although the water reservoir 252, as shown, is housed above the chassis 114 in the front compartment 108, it will be understood that this disclosure is applicable in principle to otherwise similar vehicles including the water reservoir 252 housed otherwise above the chassis 114, including in the rear compartment 110 or between the passenger compartment 106 and the rear compartment 110.

Among other things, it follows that, in the FCV 100, the water reservoir 252 is housed away from the fuel cell stack 202. Moreover, with the fuel cell stack 202 housed in the chassis 114, and the water reservoir 252 housed above the chassis 114 in the front compartment 108, the water reservoir 252 enjoys a more spacious packaging space in the FCV 100 than the fuel cell stack 202. Specifically, with the FCV 100 including the motor 206 in the chassis 114 in place of an engine in the front compartment 108, the front compartment 108 is more spacious than the chassis 114.

Taking advantage of the more spacious packaging space in the FCV 100, the water reservoir 252 is rightsized for storing water from the fuel cell stack 202. For instance, the operation of the FCV 100 may be modeled in terms of reclamation of water from the fuel cell stack 202 and dispensation of water over time, and the water reservoir 252 may be rightsized based on the modeling. Specifically, for purposes of reclaiming water from the fuel cell stack 202 for dispensation, water from the fuel cell stack 202 is a replenishing but ultimately limited resource that ideally is not wasted. In recognition of this principle, with respect to storing water from the fuel cell stack 202, the water reservoir 252 is sized large enough to inhibit water levels in the water reservoir 252 not only from becoming too low, but also from becoming too high. Specifically, the water reservoir 252 is sized large enough to inhibit water levels in the water reservoir 252 from becoming too high as the water pump 266 is operated to pump water from the fuel cell stack 202 into the water reservoir 252 and the water pumps 270 are operated to dispense water from the water reservoir 252 over time. By sizing the water reservoir 252 large enough to inhibit water levels in the water reservoir 252 from becoming too high, water from the water reservoir 252 is not wastefully evacuated.

Among other things, it also follows that, in the FCV 100, the water reservoir 252 is housed higher than the fuel cell stack 202. As noted above, in the fuel cell stack-powered implementation, absent the fuel cell stack 202 generating surplus electrical energy when the motor 206 powers the wheels 118, the batteries 210 principally store electrical energy from the motor 206 when the motor 206 generates electrical energy using the wheels 118, and consequently retards the wheels 118. Accordingly, the fuel cell stack-powered implementation raises issues concerning using electrical energy from the batteries 210 and, in particular, issues concerning electrical energy levels in the batteries 210 becoming too low when electrical energy from the batteries 210 is used on an on-demand basis. At the same time, one, some or all of the water pumps 270 are operated to dispense water from the water reservoir 252 on an on-demand basis. Likewise, in association with dispensing water from the water reservoir 252, one, some or all of the water pumps 270 use electrical energy from the batteries 210 on an on-demand basis. On the other hand, the water pump 266 is operated to pump water from the fuel cell stack 202 into the water reservoir 252 on a time-selective basis. Likewise, in association with pumping water from the fuel cell stack 202 into the water reservoir 252, the water pump 266 uses electrical energy from the batteries 210 on a time-selective basis.

With the water reservoir 252 housed higher than the fuel cell stack 202, from the perspective of the fuel cell stack 202, the water pump 266 pumps water from the fuel cell stack 202 into the water reservoir 252 against gravity. With the water pump 266 having pumped water from the fuel cell stack 202 into the water reservoir 252 against gravity, water in the water reservoir 252 has gravitational potential energy. Moreover, with water in the water reservoir 252 having gravitational potential energy, the water pumps 270 dispense water from the water reservoir 252 under assistance from gravitational potential energy of water in the water reservoir 252. Accordingly, in association with dispensing water from the water reservoir 252 under assistance from gravitational potential energy of water in the water reservoir 252, the water pumps 270, although using electrical energy from the batteries 210 on an on-demand basis, use commensurately less electrical energy from the batteries 210. Moreover, in association with pumping water from the fuel cell stack 202 into the water reservoir 252 against gravity, the water pump 266, although using commensurately offsetting electrical energy from the batteries 210, only uses electrical energy from the batteries 210 on a time-selective basis. Accordingly, notwithstanding the water pumps 270 being operated to dispense water from the water reservoir 252 on an on-demand basis, the water pump 266 is operated to pump water from the fuel cell stack 202 into the water reservoir 252 on a time-selective basis to inhibit electrical energy levels in the batteries 210 from becoming too low.

In relation to the heat exchanger 236 rejecting heat from the fuel cell stack 202, with the heat exchanger 236 housed in the front compartment 108, a water dispensation line 262A leads to the front compartment 108. On the water dispensation line 262A, the water piping network 254 includes a water pump 270A and a water applicator 272A for the heat exchanger 236. The water pump 270A is electrically connected to the handling units 214. Moreover, the water pump 270A is fluidly connected to the water reservoir 252, and the water applicator 272A is fluidly connected to the water pump 270A. Moreover, in addition to being fluidly connected to the water pump 270A, the water applicator 272A opens into the front compartment 108 about the heat exchanger 236. The water pump 270A is operable to pump water from the water reservoir 252 through water applicator 272A using electrical energy from the handling units 214. The water applicator 272A is operable to spray, mist, sprinkle or otherwise apply water passing through the water applicator 272A. Accordingly, in conjunction with the water applicator 272A, the water pump 270A is operable to apply water from the water reservoir 252 onto the heat exchanger 236. Water on the heat exchanger 236 vaporizes in airflow across the heat exchanger 236. Accordingly, when water from the water reservoir 252 is applied onto the heat exchanger 236, the heat exchanger 236 becomes operable to super-normally reject heat from coolant passing through the heat exchanger 236 to airflow across the heat exchanger 236. Moreover, as the product of super-normally rejecting heat from coolant passing through the heat exchanger 236 to airflow across the heat exchanger 236, the heat exchanger 236 becomes operable to super-normally reject heat from the fuel cell stack 202.

In terms of electrical energy and water, as well as heat, output from the fuel cell stack 202 is variable. From an electrochemical standpoint, output from the fuel cell stack 202 is commensurate with the amounts of fuel and oxygen in air combined by the electrochemical reaction. At the same time, from a broader operational standpoint, for purposes of promoting the electrochemical reaction, the heat exchanger 236, in association with rejecting heat from the fuel cell stack 202, is tasked with balancing heat from the fuel cell stack 202 with heat rejected from the fuel cell stack 202. When the heat exchanger 236 counter-balances heat from the fuel cell stack 202 with heat rejected from the fuel cell stack 202, temperatures in the fuel cell stack 202 are ideal (e.g., approximately 75 degrees Celsius or otherwise between approximately 60 degrees Celsius and approximately 80 degrees Celsius). When the heat exchanger 236 under-balances heat from the fuel cell stack 202 with heat rejected from the fuel cell stack 202, temperatures in the fuel cell stack 202 become too high (e.g., above approximately 80 degrees Celsius). When the heat exchanger 236 over-balances heat from the fuel cell stack 202 with heat rejected from the fuel cell stack 202, temperatures in the fuel cell stack 202 become too low (e.g., below approximately 60 degrees Celsius).

As noted above, in the fuel cell stack-powered implementation, the motor 206 principally powers the wheels 118 using electrical energy from the fuel cell stack 202. In terms of electrical energy, oftentimes, even when output from the fuel cell stack 202 is already high, still higher output from the fuel cell stack 202 would be advantageous. However, in association with higher output from the fuel cell stack 202, the heat exchanger 236 sometimes under-balances heat from the fuel cell stack 202 with heat rejected from the fuel cell stack 202. When the heat exchanger 236 under-balances heat from the fuel cell stack 202 with heat rejected from the fuel cell stack 202, higher output from the fuel cell stack 202 is infeasible. However, when the water pump 270A applies water from the water reservoir 252 onto the heat exchanger 236, and the heat exchanger 236 super-normally rejects heat from the fuel cell stack 202, the heat exchanger 236 restoratively counter-balances heat from the fuel cell stack 202 with heat rejected from the fuel cell stack 202. When the heat exchanger 236 restoratively counter-balances heat from the fuel cell stack 202 with heat rejected from the fuel cell stack 202, higher output from the fuel cell stack 202 becomes feasible. Accordingly, the fuel cell stack 202 becomes operable to super-normally generate electrical energy and water.

Notably, the water pump 270A is selectively operated to apply water from the water reservoir 252 onto the heat exchanger 236. Initially, if the water pump 270A indiscriminately applies water from the water reservoir 252 onto the heat exchanger 236, water levels in the water reservoir 252 become too low. Moreover, normally, in association with most output from the fuel cell stack 202, the heat exchanger 236 counter-balances heat from the fuel cell stack 202 with heat rejected from the fuel cell stack 202. When the heat exchanger 236 counter-balances heat from the fuel cell stack 202 with heat rejected from the fuel cell stack 202, if the water pump 270A indiscriminately applies water from the water reservoir 252 onto the heat exchanger 236, and the heat exchanger 236 super-normally rejects heat from the fuel cell stack 202, the heat exchanger 236 disruptively over-balances heat from the fuel cell stack 202 with heat rejected from the fuel cell stack 202. Accordingly, the water pump 270A is selectively operated to apply water from the water reservoir 252 onto the heat exchanger 236 to inhibit the heat exchanger 236 from under-balancing heat from the fuel cell stack 202 with heat rejected from the fuel cell stack 202.

In an onboard tap water implementation, a water dispensation line 262B leads to the passenger compartment 106. On the water dispensation line 262B, the water piping network 254 includes a water pump 270B, a water filter 274 and a water tap 272B. The water pump 270B is electrically connected to the handling units 214. Moreover, the water pump 270B is fluidly connected to the water reservoir 252, and the water tap 272B is fluidly connected to the water pump 270B through the water filter 274. Moreover, in addition to being fluidly connected to the water pump 270B through the water filter 274, the water tap 272B opens into the passenger compartment 106. The water pump 270B is operable to pump water from the water reservoir 252 through the water filter 274 and through the water tap 272B using electrical energy from the handling units 214. The water filter 274 is operable to filter water passing through the water filter 274. The water tap 272B is user-operable to dispense water passing through the water tap 272B. Accordingly, in conjunction with the water filter 274 and the water tap 272B, the water pump 270B is operable to dispense filtered water from the water reservoir 252 into the passenger compartment 106 for drinking, cooking, washing and the like.

In an onboard power washer implementation, a water dispensation line 262C leads to the exterior 104. On the water dispensation line 262C, the water piping network 254 includes a water pump 270C and a water hookup 272C, as well as a high-pressure water hose and nozzle unit 276 typical of power washers. The water pump 270C is electrically connected to the handling units 214. Moreover, the water pump 270C is fluidly connected to the water reservoir 252, and the water hookup 272C is fluidly connected to the water pump 270C. Moreover, in addition to being fluidly connected to the water pump 270C, the water hookup 272C opens at the exterior 104. Moreover, the water hose and nozzle unit 276 is fluidly connected to the water hookup 272C. The water pump 270C is operable to pump water from the water reservoir 252 through the water hookup 272C using electrical energy from the handling units 214. The water hookup 272C is operable to dispense water passing through the water hookup 272C at the exterior 104. The water hose and nozzle unit 276 is user-operable to dispense water passing through the water hose and nozzle unit 276 under pressure. Accordingly, in conjunction with the water hookup 272C and the water hose and nozzle unit 276, the water pump 270C is operable to dispense water from the water reservoir 252 under pressure at the exterior 104 for power washing the FCV 100 and items in the environment surrounding the FCV 100.

The FCV 100 is equipped, in operation, to perform vehicle functions on behalf of the FCV 100, and thereby satisfy corresponding vehicle demands on behalf of the FCV 100. Specifically, the energy system 130 is operable to perform energy functions, and thereby satisfy corresponding energy demands, the propulsion system 132 is operable to perform propulsion functions, and thereby satisfy corresponding propulsion demands, the auxiliary systems 134 are operable to perform auxiliary functions, and thereby satisfy corresponding auxiliary demands, and the water system 136 is operable to perform water functions, and thereby satisfy corresponding water demands.

The energy demands may include any combination of demands to generate electrical energy, demands to generate water, demands to reject heat from the fuel cell stack 202, demands to store electrical energy, including demands to store electrical energy from the fuel cell stack 202, and demands to store electrical energy from the motor 206, demands to condition and otherwise handle electrical energy, and demands to store and otherwise handle fuel. The propulsion demands may include demands to power the wheels 118, and demands to generate electrical energy using the wheels 118, and consequently retard the wheels 118. Any combination of the energy demands and the propulsion demands may be part of combined energy and propulsion demands, such as demands to regeneratively brake the FCV 100. The auxiliary demands may include any combination of demands to frictionally brake the FCV 100, demands to steer the FCV 100 and demands to perform accessory functions. The water demands may include any combination of demands to discharge water from the water collector 250, demands to reclaim water from the fuel cell stack 202, including demands to pump water from the fuel cell stack 202 into the water reservoir 252, demands to evacuate water from the water reservoir 252, and demands to dispense water from the water reservoir 252, including demands to apply water from the water reservoir 252 onto the heat exchanger 236, demands to dispense filtered water from the water reservoir 252 into the passenger compartment 106, and demands to dispense water from the water reservoir 252 under pressure at the exterior 104.

Figure 3:
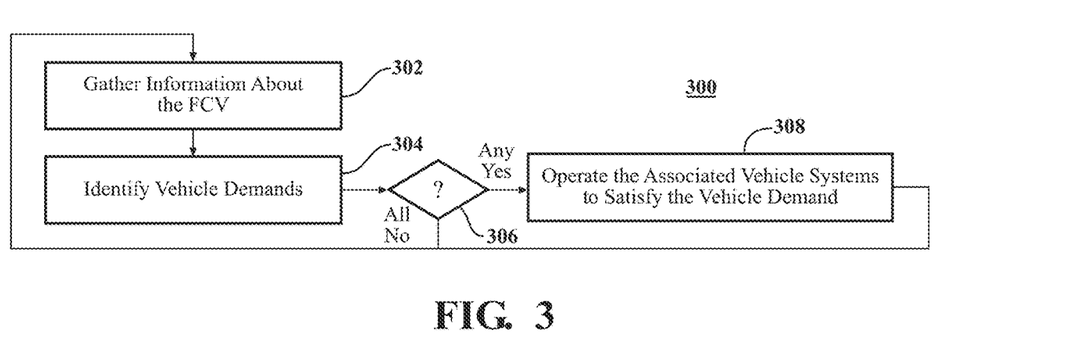
FIG. 3 is a flowchart showing the operations of a process by which the control module orchestrates the operation of the FCV.

The operations of a process 300 for operating the FCV 100 under the orchestration of the control module 128 are shown in FIG. 3. According to the process 300, the control module 128 orchestrates the operation of the FCV 100.

In operation 302, the control module 128 gathers information about the FCV 100, including the information about the FCV 100 detected by the sensor system 122. In operation 304, the control module 128 evaluates the information about the FCV 100, including monitoring for and identifying vehicle demands. For purposes of identifying vehicle demands and otherwise evaluating information about the FCV 100 according to operation 304, the control module 128 may evaluate any combination of evident and prospective information about the FCV 100, and may identify any combination of evident and prospective vehicle demands.

In operations 306 and 308, the control module 128 operates the vehicle systems 120 based on its evaluation of the information about the FCV 100. Specifically, when, according to operation 306, the control module 128 does not identify a vehicle demand, the control module 128 does not operate the associated vehicle systems 120. Otherwise, when the control module 128 identifies a vehicle demand according to operation 306, in operation 308, the control module 128 operates the associated vehicle systems 120 to satisfy the vehicle demand. For instance, when the control module 128 identifies an energy demand according to operation 306, the control module 128 operates the energy system 130 to satisfy the energy demand in operation 308. And, when the control module 128 identifies a propulsion demand according to operation 306, the control module 128 operates the propulsion system 132 to satisfy the propulsion demand in operation 308. Moreover, when the control module 128 identifies an auxiliary demand according to operation 306, the control module 128 operates the auxiliary systems 134 to satisfy the auxiliary demand in operation 308. Moreover, when the control module 128 identifies a water demand according to operation 306, the control module 128 operates the water system 136 to satisfy the water demand in operation 308. For purposes of identifying vehicle demands and operating the associated vehicle systems 120 to satisfy the vehicle demands according to operations 306 and 308, the control module 128 may operate the associated vehicle systems 120 on any combination of on-demand bases and time-selective bases.

In both cases, the control module 128 continues to gather information about the FCV 100 according to operation 302, and continues to evaluate the information about the FCV 100 according to operation 304. Following not operating the vehicle systems 120, as part of its continued evaluation of the information about the FCV 100 according to operation 304, the control module 128 continues to monitor for vehicle demands in anticipation that previously-unidentified vehicle demands will materialize. On the other hand, following operating the associated vehicle systems 120 to satisfy the vehicle demand according to operation 308, as part of its continued evaluation of the information about the FCV 100 according to operation 304, the control module 128 continues to identify vehicle demands in anticipation that the previously-identified vehicle demand will be satisfied. When the previously-identified vehicle demand is satisfied, and the previously-identified vehicle demand is thus no longer identified according to operation 304, the control module 128 concludes operating the associated vehicle systems 120.

For purposes of identifying vehicle demands and otherwise evaluating information about the FCV 100 according to operation 304, the control module 128 may gather any combination of information about user requests and information about the operation of the FCV 100. This and other information about the FCV 100 may be detected by the sensor system 122. The information about user requests may include any combination of user inputs requesting powering the wheels 118, user inputs requesting braking, steering and the like, user inputs requesting accessory functions, including user inputs requesting navigation, and user inputs requesting water functions, including user inputs requesting dispensing water from the water reservoir 252. The information about the operation of the FCV 100 may include any combination of the location and motion of the FCV 100, the movement of the wheels 118, and the operational statuses of one, some or all of the vehicle systems 120. The operational statuses of the vehicle systems 120 may include any combination of operation of the vehicle systems 120 and associated electrical energy loads on the batteries 210 from the vehicle systems 120. Moreover, with respect to the energy system 130, the operational statuses of the vehicle systems 120 may include any combination of output from the fuel cell stack 202, including any combination of electrical energy from the fuel cell stack 202, water from the fuel cell stack 202, heat from the fuel cell stack 202 and temperatures in the fuel cell stack 202, heat rejected from the fuel cell stack 202 by the heat exchanger 236 and electrical energy levels in the batteries 210. Moreover, with respect to the propulsion system 132, the operational statuses of the vehicle systems 120 may include electrical energy from the motor 206. For instance, with respect to the water system 136, the operational statuses of the vehicle systems 120 may include any combination of water levels in the water collector 250 and water levels in the water reservoir 252.

According to the process 300, as part of orchestrating the operation of the FCV 100, the control module 128 orchestrates the operation of water system 136. According to one aspect of the operation of water system 136, as noted above, the water pumps 270 are operated to dispense water from the water reservoir 252 on an on-demand basis. Moreover, notwithstanding the water pumps 270 being operated to dispense water from the water reservoir 252 on an on-demand basis, the water pump 266 is operated to pump water from the fuel cell stack 202 into the water reservoir 252 on a time-selective basis to inhibit electrical energy levels in the batteries 210 from becoming too low. Likewise, according to operations 306 and 308, the control module 128 operates the water pumps 270 to dispense water from the water reservoir 252 on an on-demand basis, and operates the water pump 266 to pump water from the fuel cell stack 202 into the water reservoir 252 on a time-selective basis to inhibit electrical energy levels in the batteries 210 from becoming too low.

Specifically, when the control module 128 identifies a demand to dispense water from the water reservoir 252 according to operation 306, in operation 308, the control module 128 operates the water pumps 270 to satisfy the demand to dispense water from the water reservoir 252. For instance, demands to apply water from the water reservoir 252 onto the heat exchanger 236 correspond to the heat exchanger 236 under-balancing heat from the fuel cell stack 202 with heat rejected from the fuel cell stack 202 during operation of the fuel cell stack 202. For purposes of promoting the electrochemical reaction, when the control module 128 identifies a demand to apply water from the water reservoir 252 onto the heat exchanger 236 according to operation 306, in operation 308, the control module 128 operates the water pump 270A to satisfy the demand to apply water from the water reservoir 252 onto the heat exchanger 236. Moreover, demands to dispense filtered water from the water reservoir 252 correspond to like user requests associated with user-operation of the water tap 272B. For purposes of satisfying user expectations, when the control module 128 identifies a demand to dispense filtered water from the water reservoir 252 according to operation 306, in operation 308, the control module 128 operates the water pump 270B to satisfy the demand to dispense filtered water from the water reservoir 252. Similarly, demands to dispense water from the water reservoir 252 under pressure correspond to like user requests associated with user-operation of the water hose and nozzle unit 276. For purposes of satisfying user expectations, when the control module 128 identifies a demand to dispense water from the water reservoir 252 under pressure according to operation 306, in operation 308, the control module 128 operates the water pump 270C to satisfy the demand to dispense water from the water reservoir 252 under pressure. Otherwise, when, according to operation 306, the control module 128 does not identify a demand to dispense water from the water reservoir 252, the control module 128 does not operate the water pumps 270.

To inhibit electrical energy levels in the batteries 210 from becoming too low, the control module 128 operates the water pump 266 to pump water from the fuel cell stack 202 into the water reservoir 252 in response to sufficient electrical energy levels in the batteries 210 for the water pump 266 to pump water from the fuel cell stack 202 into the water reservoir 252. Accordingly, as part of its evaluation of the information about the FCV 100 according to operation 304, the control module 128 identifies sufficient electrical energy levels in the batteries 210. Identifying sufficient electrical energy levels in the batteries 210 may include identifying high electrical energy levels in the batteries 210. Additionally, or alternatively, identifying sufficient electrical energy levels in the batteries 210 may include identifying low electrical energy loads on the batteries 210. Additionally, or alternatively, identifying sufficient electrical energy levels in the batteries 210 may include identifying any combination of user inputs requesting braking and/or user inputs requesting navigation associated with demands to retard the wheels 118 (e.g., in relation to decelerating the FCV 100, maintaining the speed of the FCV 100 on downhill ground, regeneratively braking the FCV 100, etc.), electrical energy from the motor 206, high electrical energy from the fuel cell stack 202, surplus electrical energy from the fuel cell stack 202 for the motor 206 to power the wheels 118 and the like.

Demands to pump water from the fuel cell stack 202 into the water reservoir 252 correspond to any combination of high water levels in the water collector 250, low water levels in the water reservoir 252, insufficient water levels in the water reservoir 252 for the water pumps 270 to dispense water from the water reservoir 252, operation of the water pumps 270 to dispense water from the water reservoir 252 and the like. When the control module 128 identifies a demand to pump water from the fuel cell stack 202 into the water reservoir 252 according to operation 306, and identifies sufficient electrical energy levels in the batteries 210 according to operation 304, in operation 308, the control module 128 operates the water pump 266 to satisfy the demand to pump water from the fuel cell stack 202 into the water reservoir 252. Otherwise, when, according to operation 304, the control module 128 does not identify sufficient electrical energy levels in the batteries 210, the control module 128 does not operate the water pump 266. However, as part of its continued evaluation of the information about the FCV 100 according to operation 304, the control module 128 continues to monitor for sufficient electrical energy levels in the batteries 210 in anticipation that previously-unidentified sufficient electrical energy levels in the batteries 210 will materialize. When the control module 128 identifies previously-unidentified sufficient electrical energy levels in the batteries 210 according to operation 304, in operation 308, the control module 128 operates the water pump 266 to satisfy the previously-identified demand to pump water from the fuel cell stack 202 into the water reservoir 252.

Moreover, when, according to operation 306, the control module 128 does not identify a demand to pump water from the fuel cell stack 202 into the water reservoir 252, and identifies sufficient electrical energy levels in the batteries 210 according to operation 304, the control module 128 seeks to take advantage of sufficient electrical energy levels in the batteries 210. Specifically, as part of its continued evaluation of the information about the FCV 100 according to operation 304, the control module 128 monitors for and identifies latent demands to pump water from the fuel cell stack 202 into the water reservoir 252. When the control module 128 identifies a latent demand to pump water from the fuel cell stack 202 into the water reservoir 252 according to operation 304, in operation 308, the control module 128 operates the water pump 266 to satisfy the latent demand to pump water from the fuel cell stack 202 into the water reservoir 252. Otherwise, when, according to operation 304, the control module 128 does not identify a latent demand to pump water from the fuel cell stack 202 into the water reservoir 252, the control module 128 does not operate the water pump 266.

With reference once again to FIG. 1, as noted above, the processors 124, the memory 126 and the control module 128 together serve as a computing device whose control module 128 orchestrates the operation of the FCV 100. The control module 128 may be a global control module that orchestrates the global operation of the FCV 100, including but not limited to the operation of the vehicle systems 120. Relatedly, as part of a central control system, the FCV 100 may include a global control unit (GCU) to which the control module 128 belongs. Additionally, or alternatively, the control module 128 may be a power control module that orchestrates the operation of the energy system 130 and the propulsion system 132, as well as the auxiliary systems 134 and the water system 136. Relatedly, the FCV 100 may include a power control unit (PCU) to which the control module 128 belongs. Although the FCV 100, as shown, includes one control module 128, it will be understood that this disclosure is applicable in principle to otherwise similar vehicles including multiple control modules 128.

The processors 124 may be any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 include random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control module 128. The memory 126 may be part of the processors 124 or the control module 128, or may be communicatively connected the processors 124 or the control module 128.

Generally speaking, the control module 128 includes instructions that may be executed by the processors 124. The control module 128 may be implemented as computer readable program code that, when executed by the processors 124, executes one or more of the processes described herein. Such computer readable program code may be stored on the memory 126. The control module 128 may be part of the processors 124, or may be communicatively connected the processors 124.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    at least one fuel cell stack, the at least one fuel cell stack operable to generate electrical energy and water;
    a water reservoir housed higher than the at least one fuel cell stack, the water reservoir operable to store water;
    a first water pump, the first water pump operable to pump water from the at least one fuel cell stack into the water reservoir against gravity;
    a second water pump, the second water pump operable to dispense water from the water reservoir under assistance from gravitational potential energy of water in the water reservoir; and
    a control module, the control module programmed to operate the second water pump on an on-demand basis, and operate the first water pump on a time-selective basis.

2. The vehicle of claim 1, further comprising:
    a drivetrain, the drivetrain including at least one wheel; and
    a chassis, the chassis supporting the drivetrain; wherein the at least one fuel cell stack is housed in the chassis, and the water reservoir is housed above the chassis.

3. The vehicle of claim 1, further comprising:
    multiple packaging spaces; wherein
    the at least one fuel cell stack and the water reservoir share different packaging spaces, and the water reservoir is sized large enough to inhibit water levels in the water reservoir from becoming too high as the first water pump and the second water pump are operated over time.

4. The vehicle of claim 1, further comprising:
    a heat exchanger, the heat exchanger operable to reject heat from the at least one fuel cell stack; wherein the second water pump is operable to apply water from the water reservoir onto the heat exchanger, whereupon the heat exchanger becomes operable to super-normally reject heat from the at least one fuel cell stack.

5. The vehicle of claim 1, wherein the second water pump is operable to dispense filtered water from the water reservoir.

6. The vehicle of claim 1, wherein the second water pump is operable to dispense water from the water reservoir under pressure.

7. A vehicle, comprising:
    at least one fuel cell stack, the at least one fuel cell stack operable to generate electrical energy and water;
    at least one battery, the at least one battery operable to store electrical energy;
    a water reservoir housed higher than the at least one fuel cell stack, the water reservoir operable to store water;
    a first water pump, the first water pump operable to pump water from the at least one fuel cell stack into the water reservoir against gravity using electrical energy from the at least one battery;
    a second water pump, the second water pump operable to dispense water from the water reservoir under assistance from gravitational potential energy of water in the water reservoir using electrical energy from the at least one battery; and
    a control module, the control module programmed to operate the second water pump on an on-demand basis, and operate the first water pump on a time-selective basis to inhibit electrical energy levels in the at least one battery from becoming too low.

8. The vehicle of claim 7, wherein the control module is programmed to operate the first water pump in response to sufficient electrical energy levels in the at least one battery for the first water pump to pump water from the at least one fuel cell stack into the water reservoir.

9. The vehicle of claim 7, further comprising:
a drivetrain, the drivetrain including at least one wheel; and
a chassis, the chassis supporting the drivetrain; wherein the at least one fuel cell stack is housed in the chassis, and the water reservoir is housed above the chassis.

10. The vehicle of claim 7, further comprising:
multiple packaging spaces; wherein
the at least one fuel cell stack and the water reservoir share different packaging spaces, and the water reservoir is sized large enough to inhibit water levels in the water reservoir from becoming too high as the first water pump and the second water pump are operated over time.

11. The vehicle of claim 7, further comprising:
a heat exchanger, the heat exchanger operable to reject heat from the at least one fuel cell stack; wherein
the second water pump is operable to apply water from the water reservoir onto the heat exchanger, whereupon the heat exchanger becomes operable to super-normally reject heat from the at least one fuel cell stack.

12. The vehicle of claim 7, wherein the second water pump is operable to dispense filtered water from the water reservoir.

13. The vehicle of claim 7, wherein the second water pump is operable to dispense water from the water reservoir under pressure.

14. A vehicle, comprising:
a drivetrain, the drivetrain including at least one wheel;
at least one fuel cell stack, the at least one fuel cell stack operable to generate electrical energy and water;
at least one motor, the at least one motor operable to power the at least one wheel using electrical energy from the at least one fuel cell stack, and generate electrical energy using the at least one wheel, and consequently retard the at least one wheel;
at least one battery, the at least one battery operable to store electrical energy from any combination of the at least one fuel cell stack and the at least one motor;
a water reservoir housed higher than the at least one fuel cell stack, the water reservoir operable to store water;
a first water pump, the first water pump operable to pump water from the at least one fuel cell stack into the water reservoir against gravity using electrical energy from the at least one battery;
a second water pump, the second water pump operable to dispense water from the water reservoir under assistance from gravitational potential energy of water in the water reservoir using electrical energy from the at least one battery; and
a control module, the control module programmed to:
operate the second water pump on an on-demand basis;
identify sufficient electrical energy levels in the at least one battery for the first water pump to pump water from the at least one fuel cell stack into the water reservoir; and
operate the first water pump in response to sufficient electrical energy levels in the at least one battery.

15. The vehicle of claim 14, wherein identifying sufficient electrical energy levels in the at least one battery includes identifying any combination of user inputs requesting braking, user inputs requesting navigation associated with demands to retard the at least one wheel, electrical energy from the at least one motor and surplus electrical energy from the at least one fuel cell stack for the at least one motor to power the at least one wheel.

16. The vehicle of claim 14, further comprising:
a chassis, the chassis supporting the drivetrain; wherein the at least one fuel cell stack is housed in the chassis, and the water reservoir is housed above the chassis.

17. The vehicle of claim 14, further comprising:
a chassis, the chassis supporting the drivetrain; and
a passenger compartment and a front compartment forward of the passenger compartment; wherein
the at least one fuel cell stack is housed in the chassis, the vehicle includes the at least one motor in the chassis in place of an engine in the front compartment, and the water reservoir is housed above the chassis in the front compartment, and sized large enough to inhibit water levels in the water reservoir from becoming too high as the first water pump and the second water pump are operated over time.

18. The vehicle of claim 14, further comprising:
multiple packaging spaces, the packaging spaces including any combination of a chassis supporting the drivetrain, a passenger compartment, a front compartment forward of the passenger compartment, a rear compartment rearward of the passenger compartment and between the passenger compartment and the rear compartment; wherein
the at least one fuel cell stack and the water reservoir share different packaging spaces, and the water reservoir is sized large enough to inhibit water levels in the water reservoir from becoming too high as the first water pump and the second water pump are operated over time.

19. The vehicle of claim 14, further comprising:
a heat exchanger, the heat exchanger operable to reject heat from the at least one fuel cell stack; wherein
the second water pump is operable to apply water from the water reservoir onto the heat exchanger, whereupon the heat exchanger becomes operable to super-normally reject heat from the at least one fuel cell stack.

20. The vehicle of claim 14, wherein the second water pump is at least one of operable to dispense filtered water from the water reservoir and operable to dispense water from the water reservoir under pressure.

* * * * *